United States Patent
Shiota et al.

[19]

[11] Patent Number: 6,157,459
[45] Date of Patent: Dec. 5, 2000

[54] METHOD AND APPARATUS FOR OUTPUTTING PICTURE IMAGE DATA

[75] Inventors: Kazuo Shiota, Tokyo; Norihisa Haneda, Saitama-ken; Shigeaki Fukada, Tokyo; Shuichi Ohtsuka, Kanagawa-ken, all of Japan

[73] Assignee: Fuji Photo Film Co., Ltd., Minamiashigara, Japan

[21] Appl. No.: 08/997,560

[22] Filed: Dec. 23, 1997

[30] Foreign Application Priority Data

Dec. 24, 1996 [JP] Japan .................................. 8-342876
Mar. 12, 1997 [JP] Japan .................................. 9-057216

[51] Int. Cl.[7] ........................... G06F 15/00; H04N 1/00
[52] U.S. Cl. ........................................ 358/1.15; 358/404
[58] Field of Search ................................. 358/404, 444, 358/442, 468, 434, 1.9, 1.13, 1.15, 1.16; 711/202, 205, 206, 207, 209, 220, 221

[56] References Cited

U.S. PATENT DOCUMENTS

| | | | |
|---|---|---|---|
| 4,039,258 | 8/1977 | Hujer et al. | 355/27 |
| 4,607,949 | 8/1986 | Hakamada et al. | 355/40 |
| 4,965,626 | 10/1990 | Robinson et al. | 355/40 |
| 5,124,742 | 6/1992 | Yoshikawa | 355/27 |
| 5,159,385 | 10/1992 | Imamura | 355/28 |
| 5,706,097 | 1/1998 | Schelling et al. | 358/296 |
| 5,715,034 | 2/1998 | Yamamoto | 355/40 |
| 5,949,551 | 9/1999 | Miller et al. | 358/408 |

*Primary Examiner*—Madeleine Nguyen

[57] ABSTRACT

When the picture image data stored in a removable medium or a hard disc are printed or output as a file according to an order placed by a customer, output processing is carried out efficiently by an operator regardless of his/her experience. A task in which a unit of output processing is carried out is assigned to each printing material or to each kind of medium, and received order information is stored with images to be processed. Units of processing are grouped in terms of the kind of task. The image data grouped in different groups are stored in different buffers, and the image data in the same buffer are output collectively when corresponding to the same printing material or to a recording medium from each buffer, to thereby reduce the number of changes of printing materials or recording media.

5 Claims, 2 Drawing Sheets

METHOD AND APPARATUS FOR OUTPUTTING PICTURE IMAGE DATA

BACKGROUND OF THE INVENTION

1. Field of the Invention

The present invention relates to a method and an apparatus for outputting picture image data. More specifically, the present invention relates to a method and an apparatus for outputting picture image data whereby plural kinds of output processing are carried out while changing printing materials or media for writing.

2. Description of the Related Art

A photographic printer has been known which obtains picture image data by reading a picture image recorded on a photographic film (hereinafter, simply referred to as a "film") by using a film scanner, and outputs the picture image as a photographic print after image processing has been carried out on the picture image data. The photographic printer (herein referred to as "printer") of this kind sequentially outputs prints according to print instructing information, such as the number of prints, which is input by an operator.

When additional prints are made by such a printer, an operator usually classifies in advance order envelopes, order sheets or the like by the size of prints to be made so that prints of the same size can be made collectively. This is because, if the processing is carried out order by order, an operation such as exchanging printing materials will be necessary, and it will lead to operation efficiency deterioration.

Following the recent increase in the use of personal computers, a file outputting service and a photo finishing system have been proposed which output not only prints, but also files on a recording medium such as an MO disc and a Zip disc.

In such a system, operations of exchanging not only the printing materials but also recording media are necessary. Therefore, factors to be considered for improving operation efficiency will increase compared with the case of a conventional printer. As a result, it is not necessarily guaranteed that any operator can carry out output processing such as printing in an optimal procedure. It is possible that an operation procedure and the time required therefor vary greatly depending on operators' skill.

SUMMARY OF THE INVENTION

Based on consideration of the problems described above, an object of the present invention is to provide a method and an apparatus by which any operator can output picture image data efficiently regardless of his/her experience.

A picture image outputting method of the present invention comprises the steps of storing a plurality of picture image data representing picture images in a predetermined recording medium, classifying a plurality of processing items related to output processing instructed regarding the stored image data by the kind of tasks in which the processing shown by each processing item is carried out, and carrying out the processing shown by each processing item according to an order determined by the classification.

As the "predetermined recording medium", a hard disc of a server computer installed in a DPE or a laboratory, or a removable medium such as an MO disc or a Zip disc which is provided by a customer to the DPE or the like can be used.

"The processing item" herein referred to means a unit of output processing which will be carried out on the picture image data. In other words, the processing item refers to a unit of order.

More specifically, the processing item refers to information showing an image data identifying number, the name of an orderer, the kind of output processing such as print output or file output, the size and the number of prints in the case of prints, and the kind of medium and resolution of image data to be output to a medium in the case of file output, for example. The information may include information showing how urgently the processing should be carried out or the like. In other words, the processing in which the twelfth image data are output as a print in 2L size is equivalent to one processing item. This the output processing instructed by a customer or an operator can be regarded as a complex of a plurality of such processing items.

The processing item can be input one by one by an operator using a keyboard or the like. Alternatively, the processing item may be input by OCR, such as that of an order sheet. A laboratory may also accept, as the processing item, an order file generated by a customer by using a personal computer or the like and attached to image data.

The "task" is a unit of processing in a processing program installed in the outputting apparatus. It is a matter of what kind of processing is made in one unit, and it is not specifically limited here. For example, one task may be assigned to each output form. More specifically, a task may be assigned to such output processing in which image data are interpolated and enlarged to create a 2L size picture and output by a printer in which roll paper for 2L size print is set, or to output processing in which image data are compressed and output by an MO disc drive, for example. Alternatively, a task may be assigned to each orderer who requested the processing.

The "classification" may be sufficient if a suffix or the like to identify the task in which image data are processed is added to the image data so that the kind of the task can be identified. More preferably, picture image data specified by each processing item are stored in a buffer different for each class.

"According to an order determined by the classification" refers to the fact that the processing is carried out in an order determined by the classification only, not in an order of processing item instruction. In other words, while in a conventional method and apparatus, processing items have been sequentially processed in an order of order placement, in the present invention the order of input of the processing items is not taken into consideration. The present invention carries out output processing in such a manner that 10 image data are processed in task 1, 10 image data are then processed in task 2, and thereafter every 10 image data are processed collectively in each task and the processing returns to the task 1. Alternatively, it is also preferable to monitor the buffers and to have a buffer become full of output image data sequentially.

Alternatively, to carry out more efficient output processing, output processing may be carried out in the steps of temporarily storing the instructed processing items in a recording medium, sorting, based on the classification, the processing items having been stored in such an order that the efficiency of the entire output processing comprising a series of the processing items becomes greatest, and carrying out the output processing shown by each processing item according to the order.

On this occasion, the "order such that the efficiency of the entire output processing becomes greatest" refers to an order in which the number of printing material exchange becomes smallest, in the case of a series of output processing comprising a plurality of processing items wherein picture image data are recorded on different printing materials, for example. Likewise, in the case of a series of output processing comprising a plurality of processing items wherein picture image data are recorded in different media, the above order refers to an order in which the number of recording media exchange becomes smallest. Other procedures, for example a procedure in which workload of output picture prints or media classification is reduced, are also possible.

The processing procedure in which the processing efficiency becomes greatest and an algorithm for finding the processing procedure vary depending on criteria of processing efficiency judgment and may be decided as a design specification item. Alternatively, an operator may select a desired criterion among a plurality of judgment criteria.

A picture image printing apparatus of the present invention is an apparatus which carries out outputting according to the above outputting method. The picture image printing apparatus comprises image data recording means which stores a plurality of picture image data representing picture images, processing item classifying means which classifies a plurality of processing items instructed via a predetermined input means regarding processing of outputting the picture image data stored by the image data recording means by the kind of tasks in which the processing shown by each processing item is carried out, and image data outputting means which carries out the processing shown by each processing item according to an order determined by the classification by the processing item classifying means. It is preferable for the picture image printing apparatus to further comprise processing item recording means which records the instructed processing items in a predetermined recording medium, processing procedure determining means which sorts, based on the classification, the processing items recorded by the processing item recording means in such an order that efficiency of the entire output processing comprising a series of the processing items becomes greatest, and the image data outputting means which carries out the output processing shown by each processing item in the order determined by the processing procedure determining means.

According to the picture image data outputting method and apparatus of the present invention, output processing is carried out not in an order of the output processing order placement, but in a procedure which is determined according to the classification in advance of the output processing by the kind of tasks. Therefore, output processing can be carried out in a procedure which is preferable in terms of processing efficiency. In other words, if image data are classified by tasks, a plurality of picture image data can be processed collectively in each task, and the number of printing material or recording media exchange is greatly reduced. In this manner, operation efficiency can be improved.

Especially, if different buffers for different tasks are installed and the classification is carried out by storing image data to be processed in each task in each buffer for the task, the task in which the number of data to be processed is greatest, that is, the task in which the buffer therefor has become full, can be output with priority to the others.

Furthermore, if the processing items are temporarily stored in a recording medium and output processing is carried out in a procedure which is determined after optimizing the processing procedure by analyzing the limited number of processing items having been stored (for example, processing items regarding orders received in the morning), any operator can carry out the picture image data output processing in the most efficient procedure.

DESCRIPTION OF THE PREFERRED EMBODIMENT

Figure 1:
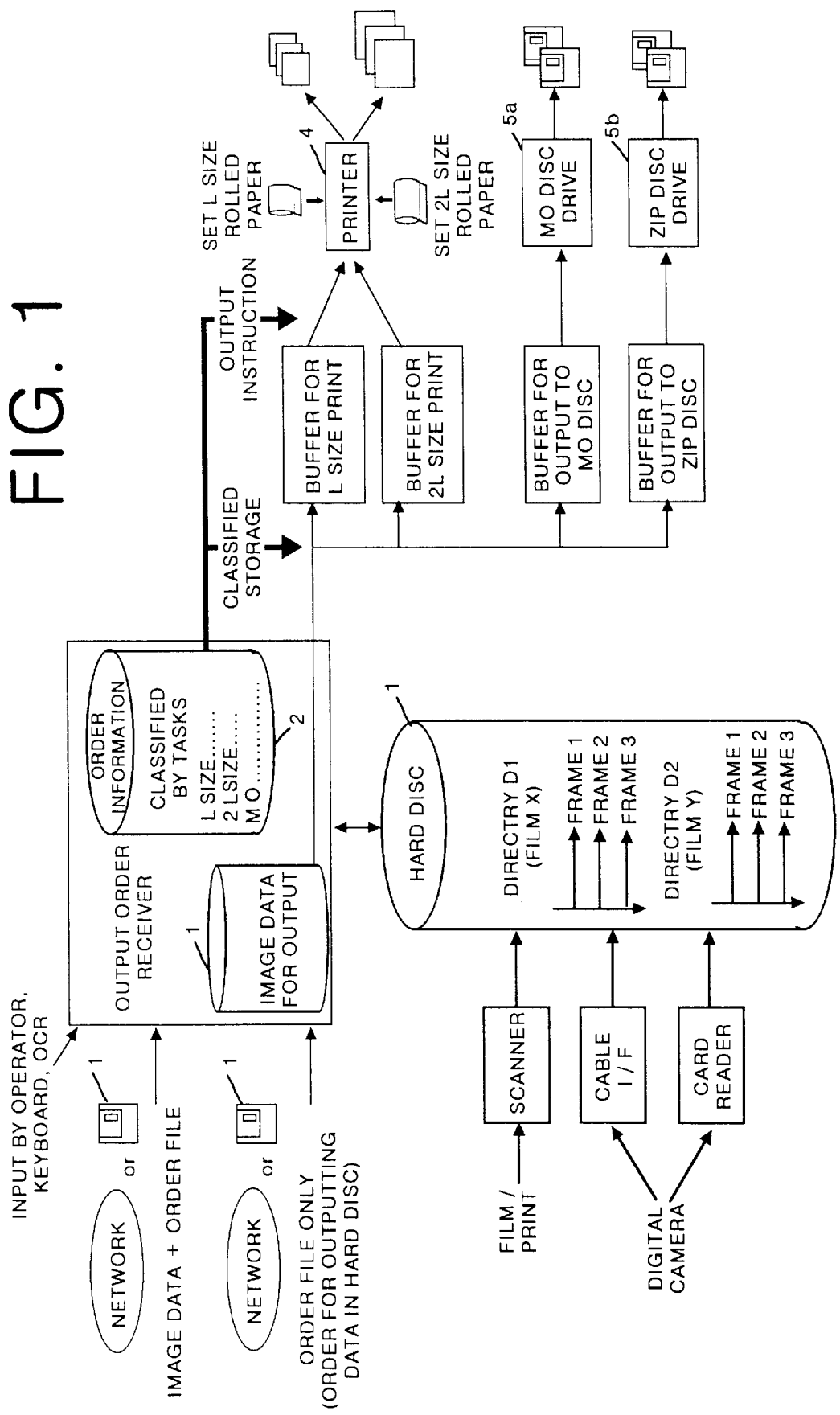
FIG. 1 is a diagram showing an embodiment of the present invention.

Hereinafter, a picture image outputting method and apparatus of the present invention will be explained referring to the accompanying drawings. FIG. 1 depicts an embodiment of a picture image data outputting apparatus of the present invention, and shows a photo finishing system installed in a DPE or in a laboratory.

This system outputs picture image data as a picture print or a file in a removable medium such as an MO disc, a Zip disc, or a floppy disc, according to an order. The picture image data to be output are picture image data read from a film or a print by using a scanner 4, or picture image data stored in a large capacity hard disc installed in a laboratory after being transferred from a digital camera via a cable interface 5 or a card reader 6, or picture image data brought in into a laboratory via a network or a removable medium upon an order.

The picture image data in the hard disc of the laboratory are stored when first prints thereof are ordered, for example. Each picture image data may be stored under a file name which is distinguishable within a directory. Alternatively, a directory may be generated for each film (in the case of a digital camera, for each camera or a memory card) as shown in FIG. 1, and picture image data of each frame in the film may be stored in the directory. When an order is placed for additional prints or the like, ordering or processing a print is generally carried out in a unit of film. Therefore, if picture image data are stored in a hierarchy, searching for the picture image data becomes easier and the time for the search can be shortened.

An order for picture image data print or file output is received by an output order receiver. As a method of receiving an order, an operator may directly input order information by using a keyboard or the like, or an order may be input by using a scanner and OCR after the content of the order has been filled in on a predetermined format order sheet, or an order file in which order information is described may be taken in via a network or a removable medium. The order information refers to information such as the kind of output (print output or file output), and a frame number or an identification number for identifying the picture image data to be output. The number and the sizes of prints in the case of print output, and the kind of medium and resolution of picture image data to be output in the medium in the case of file output should be input as the order information. Any information necessary for carrying out an outputting service, such as how urgently the output processing is needed, can be input as the order information.

In order to clarify advantages of the present invention, problems of a conventional system will be described hereinafter. In a conventional system, when an operator inputs information for instructing the system to print (hereinafter called print ordering information), the input may not necessarily be carried out order by order. In the conventional system, since the print ordering information having been input has been immediately processed sequentially in the order of input, it has not necessarily been preferable to instruct printing in a unit of order, in terms of printing operation efficiency.

For example, assume a case where a print order includes a 2L size extra print of a first frame picture in film X, and L size extra prints of the other pictures. In addition, and another order includes a 2L size extra print of a first frame picture in film Y, and L size extra prints of the other pictures. When an operator instructs printing in an order unit, the first frame picture of film X is printed after a printing material (rolled paper) for 2L size has been set. The printing material is then changed to L size printing material and pictures of the other frames in film X are printed thereafter. The printing material is again changed and the first frame picture of film Y is then printed. The printing material is then changed for L size again and pictures of the other frames in film Y are printed thereafter. In other words, the printing materials are changed 3 times.

Therefore, an operator generally instructs printing by inputting print ordering information after considering the content of each print order in advance and appropriately classifying the print orders. For example, in the above case, an operator instructs printing of the first frame pictures of the films X and Y after setting the printing material for 2L size. The operator then exchanges the printing materials and instructs printing of the other frames of the films X and Y. Finally the operator classifies the output prints by orders. In this manner, the operator attempts reduction of the number of printing material exchange.

In a simple example such as the above, it is expected that any operator will attempt in the same manner. However, in the case of a photo finishing system with more functions, for example in the case of a photo finishing system whereby not only simple additional prints but also pictures are combined with illustrations, and postcards or calendars using picture prints can be generated and a file can be output in a variety of media such as a photo CD, an MO disc, a Zip disc, and a floppy disc, it is not necessarily guaranteed that all operators can instruct an optimal procedure to the system when a wide variety of kinds of orders using the functions are processed. Moreover, if an urgent printing request interrupts an printing operation, an operator should consider the procedure again, and the workload on an operator is therefore not light.

On the other hand, according to the method and apparatus of the present invention, orders are not processed immediately, but classified by the kind of tasks first. This classification may be classification of order information only, that is, sorting processing items to be carried out by the kind of tasks. However, it is preferable to image data which will be output to be also classified by storing the image data in buffers or directories classified by the tasks, as shown in FIG. 1.

A plurality of image data of each class are output collectively. The timing of the output may be decided by an operator. Alternatively, image data maybe output when the buffer therefor has become full, or by an instruction from the output order receiver. For example, in the case where output processing is carried out sequentially while receiving new orders, the output timing may be determined by monitoring the state of the buffers, and in the case where no new order will be input, such as outside office hours, the output order receiver may analyze the processing items which have not been processed and instruct output after sorting the processing items in an optimal processing procedure.

In the example shown in FIG. 1, the tasks refers to carrying out of output processing in which a printing material or a medium drive is specified. However, it is possible to carry out output processing in the order of urgency by setting tasks and buffers classified by the degree of urgency, or to classify orders by orderers.

Figure 2:
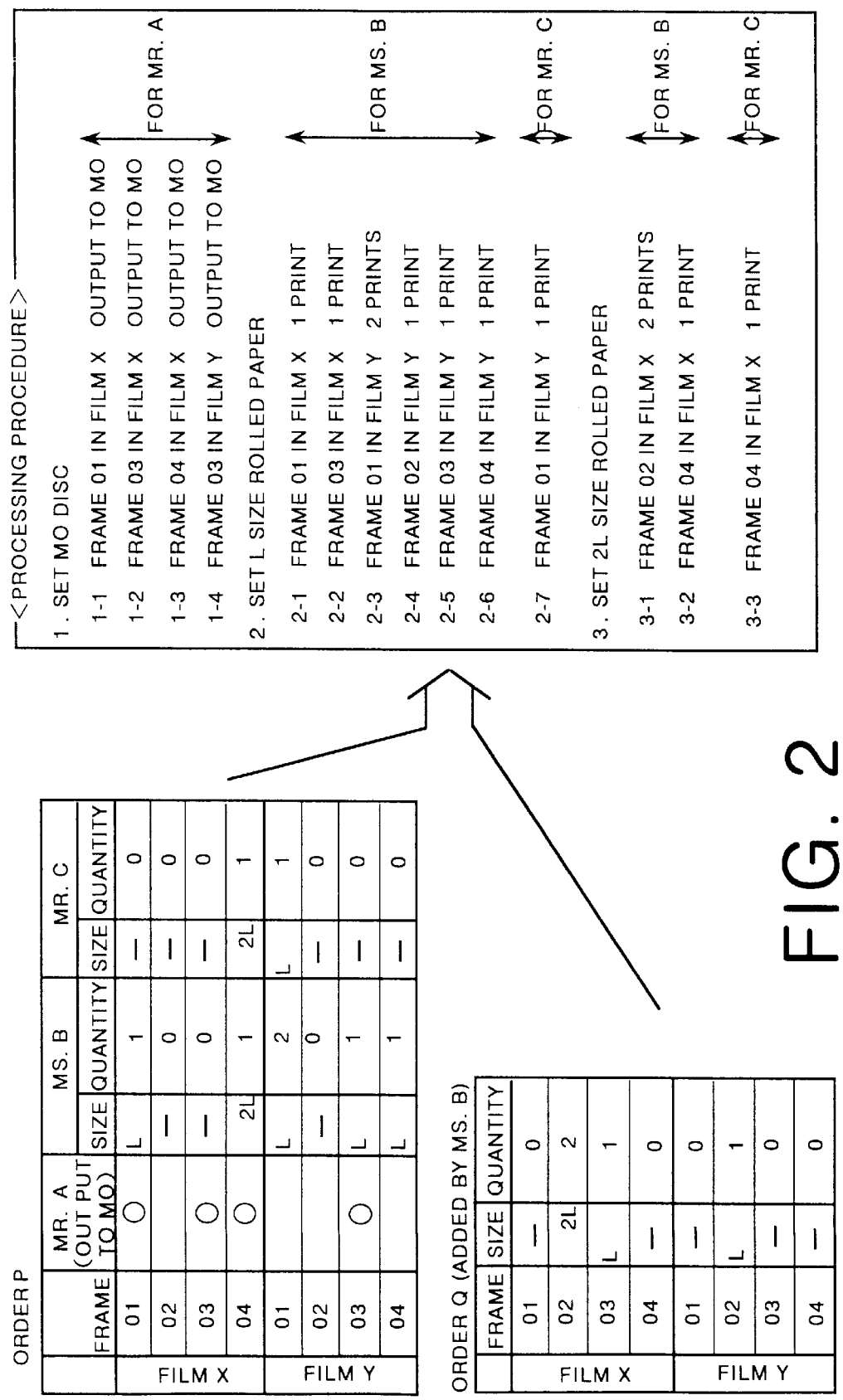
FIG. 2 is a diagram showing an example of processing procedure determined to make processing efficiency greatest.

FIG. 2 shows an example of an optimal processing procedure determined by using order information for orders P and Q. The order P is an order for extra prints of pictures recorded on a group travel. Mr. A who is a member of the group wants file output to an MO disc rather than extra prints. The order Q is an additional order by Ms. B who is also a member of the group who placed the order P. Output by orders P and Q is assumed to be returned collectively to the customers with the output being classified for each member.

In the example shown in FIG. 2, optimization is carried out in such a manner that making the number of outputting apparatus exchange minimally is a top priority, and reducing the workload of classification for each customer has the second priority. The processing procedure determined as a result is to carry out the output processing to an MO disc first, and collective print output processing for each size thereafter, as shown in FIG. 2. The print output processing for each size is carried out for each member of the group, rather than for each frame.

As for an order whose order information indicates urgency, the procedure is determined so that the order has the top priority. When an urgent request is received during the output processing, the urgent processing is carried out after an automatic interruption by a system at the time of completion of output to an MO disc, for example.

In the example shown in FIG. 2, when an interruption is carried out at the time of completion of output to an MO disc, the subsequent processing is resumed from outputting L size prints. However, if the urgent processing ends in printing on 2L size rolled paper, the processing procedure after the interruption may be determined again, since the number of printing material exchange will be reduced if 2L size printing is continued.

What has the top priority is a matter of design and the above is merely an example. The priority of reduction in the number of printing will be different between the case wherein the printing materials are exchangeable by simple switching and the case wherein the printing materials must be exchanged manually. Therefore, it is preferable to adopt an optimization method which is different for each apparatus, or to enable an operator to select an optimization method. The optimization processing is carried out by software, and its algorithm is merely a change of order by use of a predetermined key. The algorithm is obvious for those skilled in the art and detailed explanation thereof is omitted herein.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image data processing method comprising the steps of:

storing image data representing a plurality of groups of picture images, and storing associated information for processing the image data;

classifying the stored image data based upon the associated processing information such that image data stored in association with similar processed information are classified together; and processing together, image data similarly classified, based upon associated processing information, wherein image data representing images of different groups are classified and processed together when associated with similar processing information and image data representing images of a same group are classified and processed separately when associated with different processing information, wherein the processing step comprises the substeps of, sorting the classified processing information in such an order that processing efficiency is relatively maximized; and carrying out the processing according to the sorted order, and wherein the processing information includes information instructing printing of image data on one of a plurality of different printing materials; and the order is an order in which printing material exchange is minimized.

2. The image data processing method of claim 1, wherein each group of picture images corresponds to images from a single recording medium.

3. An image data processing method comprising the steps of:

storing image data representing a plurality of groups of picture images, and storing associated information for processing the image data;

classifying the stored image data based upon the associated processing information such that image data stored in association with similar processed information are classified together; and processing together, image data similarly classified, based upon associated processing information, wherein image data representing images of different groups are classified and processed together when associated with similar processing information and image data representing images of a same group are classified and processed separately when associated with different processing information, wherein the processing step comprises the substeps of, sorting the classified processing information in such an order that processing efficiency is relatively maximized; and carrying out the processing according to the sorted order, and wherein the processing information includes information instructing recording of image data in one of a plurality of different recording media, and the order is an order in which recording media exchange is minimized.

4. An image data processing apparatus comprising image data recording means for storing image data representing a plurality of groups of picture images and for storing associated information for processing the image data;

processing item classifying means for classifying the stored image data based upon the associated processing information such that image data stored in association with similar processing information are classified together;

image data outputting means for processing together, image data similarly classified, based upon associated processing information, wherein image data representing images of different groups are classified together when associated with similar processing information and image data representing images of a same group are classified and processed separately when associated with different processing information; and processing procedure determining means for sorting the classified processing information in such an order that processing efficiency is relatively maximized whereby the image data outputting means carries out the processing according to the sorted order determined by the processing procedure determining means; and whereby the processing procedure determining means sorts the processing information in an order in which printing material exchange is minimized in the case where processing information indicates image data to be recorded on different printing materials.

5. An image data processing apparatus comprising image data recording means for storing image data representing a plurality of groups of picture images and for storing associated information for processing the image data;

processing item classifying means for classifying the stored image data based upon the associated processing information such that image data stored in association with similar processing information are classified together;

image data outputting means for processing together, image data similarly classified, based upon associated processing information, wherein image data representing images of different groups are classified together when associated with similar processing information and image data representing images of a same group are classified and processed separately when associated with different processing information; and processing procedure determining means for sorting the classified processing information in such an order that processing efficiency is relatively maximized whereby, the image data outputting means carries out the processing according to the sorted order determined by the processing procedure determining means; and whereby the processing procedure determining means sorts the processing information in an order in which recording media exchange is minimized in the case where processing information indicates image data to be recorded in different recording media.

* * * * *